(12) United States Patent
Smith et al.

(10) Patent No.: US 11,460,326 B2
(45) Date of Patent: Oct. 4, 2022

(54) INDUCTIVE POSITION SENSING APPARATUS AND METHOD FOR THE SAME

(71) Applicant: AB Elektronik GMBH, Werne (DE)

(72) Inventors: Paul Smith, Cambridge (GB); David Witts, Cambridge (GB)

(73) Assignee: KYOCERA AVX Components (Werne), GmbH, Werne (DE)

( * ) Notice: Subject to any disclaimer, the term of this patent is extended or adjusted under 35 U.S.C. 154(b) by 264 days.

(21) Appl. No.: 16/943,260

(22) Filed: Jul. 30, 2020

(65) Prior Publication Data

US 2021/0055135 A1    Feb. 25, 2021

Related U.S. Application Data

(60) Provisional application No. 62/888,743, filed on Aug. 19, 2019.

(51) Int. Cl.
*G01D 5/22* (2006.01)
*H01F 5/00* (2006.01)
(Continued)

(52) U.S. Cl.
CPC ........... *G01D 5/2275* (2013.01); *H01F 5/003* (2013.01); *G01B 7/00* (2013.01); *G01D 5/204* (2013.01)

(58) Field of Classification Search
CPC ........ G01D 5/20; G01D 5/2006; G01D 5/204; G01D 5/2053; G01D 5/2086; G01D 5/225;
(Continued)

(56) References Cited

U.S. PATENT DOCUMENTS 5,815,091 A * 9/1998 Dames ................. G01D 5/2073
340/870.34
6,236,199 B1   5/2001 Irle et al.
(Continued)

FOREIGN PATENT DOCUMENTS

CN       101019005 A    8/2007
EP       0 760 087      3/1997

OTHER PUBLICATIONS

Houldsworth et al., "The Use of Harmonic Distortion to Increase the Output Voltage of a Three-Phas PWM Inverter," IEEE Transactions on Industry Applications, vol. IA-20, No. 5, Sep./Oct. 1984, pp. 1224-1228.

*Primary Examiner* — Steven L Yeninas
(74) *Attorney, Agent, or Firm* — Dority & Manning, P.A.

(57) ABSTRACT

An inductive position sensor may be configured to detect relative position between a first member and a second member. The inductive position sensor may include a transmit aerial configured to be disposed on the first member. The inductive position sensor may include a receive aerial configured to be disposed on the first member. The inductive position sensor may include processing circuitry configured to provide one or more signals indicative of the relative position between the first member and the second member based on a receive signal induced in the receive aerial resulting from a signal provided to the transmit aerial. One or more of the transmit aerial and the receive aerial may include one or more windings. A shape of the one or more windings can be a combination of a sinusoidal waveform and one or more scaled harmonics of the sinusoidal waveform.

15 Claims, 8 Drawing Sheets

(51) Int. Cl.
*G01B 7/00* (2006.01)
*G01D 5/20* (2006.01)

(58) Field of Classification Search
CPC ....... G01D 5/2275; H01F 5/003; H01F 27/28; H01F 27/385; H01F 37/00; H01F 38/14; H02K 3/28
See application file for complete search history.

(56) References Cited

U.S. PATENT DOCUMENTS

| | | |
|---|---|---|
| 7,319,319 B2 | 1/2008 | Jones et al. |
| 7,868,609 B2 | 1/2011 | Zhitomirskiy |
| 2002/0179339 A1 | 12/2002 | Ely et al. |
| 2021/0302206 A1* | 9/2021 | Ferreira Da Cunha ................... G01D 5/2053 |
| 2022/0170763 A1* | 6/2022 | Biggs ................... G01D 5/2053 |

\* cited by examiner

INDUCTIVE POSITION SENSING APPARATUS AND METHOD FOR THE SAME

PRIORITY CLAIM

The present application claims the benefit of priority of U.S. Provisional Application Ser. No. 62/888,743, titled "Inductive Position Sensing Apparatus and Method for the Same," filed on Aug. 19, 2019, which is incorporated herein by reference.

FIELD

The present disclosure relates generally to sensing relative position between two members.

BACKGROUND

Various forms of inductive position sensors are known for detecting the position of a first member relative to a second member. In some instances, one member can carry a transmit aerial and a receive aerial while the other member can carry a coupling element. The transmit aerial and the receive aerial can be arranged so that, in the presence of the coupling element, the field generated by alternating current flowing through the transmit aerial induces an electromotive force in the receive aerial that generates a current that is dependent on the position of the coupling element relative to the transmit and receive aerials. By analyzing this current, the relative position of the two members can be determined.

SUMMARY

Aspects and advantages of embodiments of the present disclosure will be set forth in part in the following description, or may be learned from the description, or may be learned through practice of the embodiments.

One example aspect of the present disclosure is directed to an inductive position sensor configured to detect relative position between a first member and a second member. The inductive position sensor may include a transmit aerial configured to be disposed on the first member. The inductive position sensor may include a receive aerial configured to be disposed on the first member. The inductive position sensor may include processing circuitry configured to provide one or more signals indicative of the relative position between the first member and the second member based on a receive signal induced in the receive aerial resulting from a signal provided to the transmit aerial. One or more of the transmit aerial and the receive aerial may include one or more windings. A shape of the one or more windings can be a combination of a sinusoidal waveform and one or more scaled harmonics of the sinusoidal waveform.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
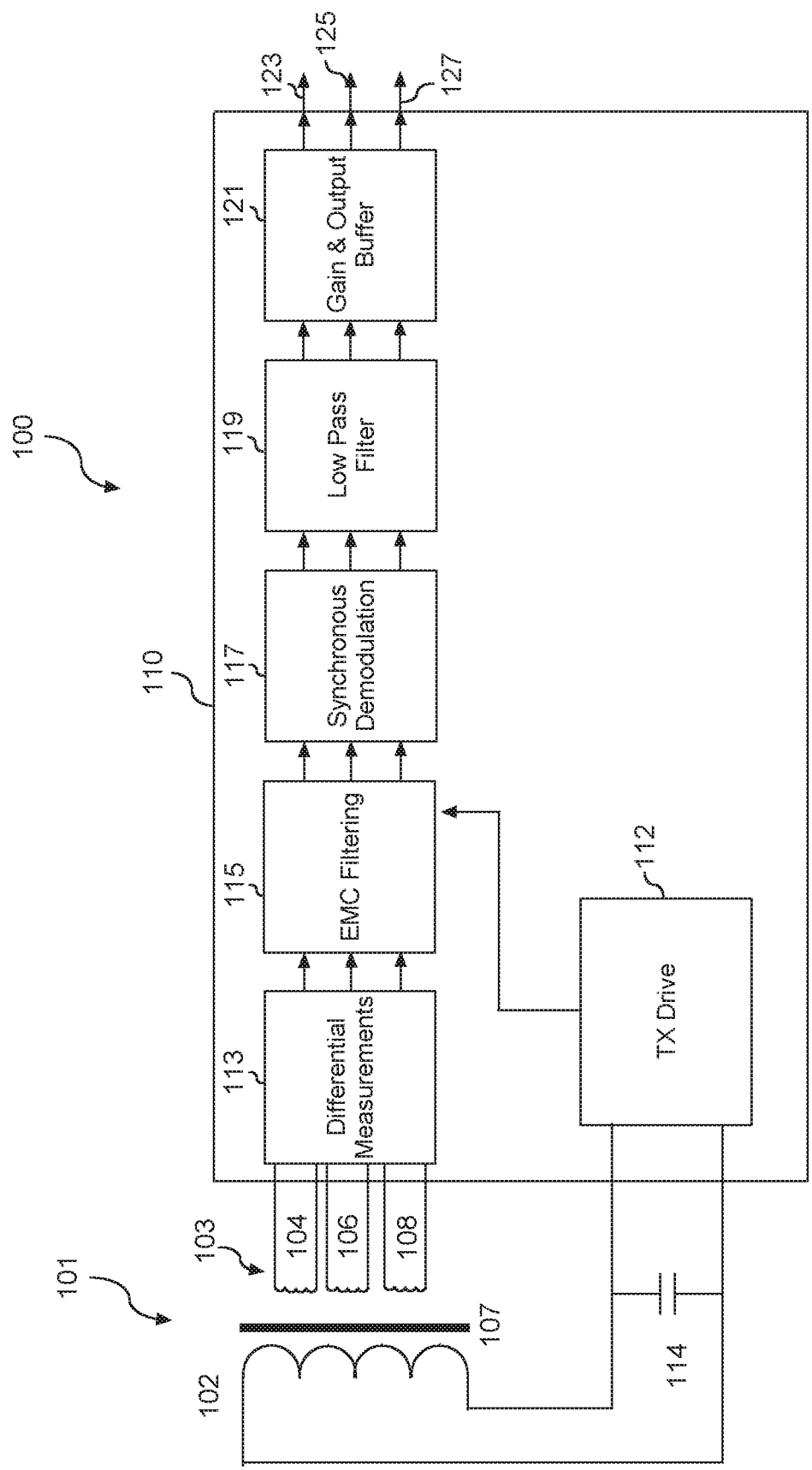
FIG. 1 depicts a schematic of select portions of an example inductive position sensor including processing circuitry according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to position sensors and, more particularly, to inductive position sensors. In particular aspects, the inductive position sensors can have one or more sinusoidally shaped windings having one or more scaled harmonics of the sinusoid integrated into the sinusoidally shaped windings.

An inductive position sensor can determine relative position between two members, such as a first member and a second member. The inductive position sensor can include a transmit aerial arranged on the first member. The transmit aerial can include one or more transmit windings. The inductive position sensor can include a receive aerial arranged on the first member. The receive aerial can include one or more receive windings. The second member can be or can include a coupling element. The coupling element can include magnetic or conductive material. For instance, in some embodiments, the coupling element can be made of and/or can include one or more regions of conductive and/or magnetic (e.g., ferromagnetic) material. In some embodiments, the coupling element can be a resonator, such as a resonator including an inductor and/or a capacitor.

An oscillating signal can be provided to the one or more transmit windings of the transmit aerial. The oscillating signal provided to the transmit aerial can induce electromotive forces in the one or more receive windings of the receive aerial. In the presence of the coupling element, a magnetic field generated by alternating current flowing through the transmit aerial can induce an electromotive force in the receive aerial (e.g., by an electromagnetic field) that generates a signal that is dependent on the position of the second member relative to the transmit and receive aerials. For instance, the coupling element can modify the electromagnetic field in a manner that is detectable based on the position of the second member and/or the coupling element. In this way, the sensor can be used to detect the relative position (e.g., linear and/or rotary position) between the two members.

In some cases, such as in a linear sensor, the length of the aerials is about equivalent to a length of the coupling element combined with a path length. The path length is typically defined by a required degree of motion of the second member, especially of the conductive element. The path length can be defined along a measurement direction, such as a linear direction, arc (e.g., curvilinear) direction, and/or a rotary direction.

In some cases, such as in rotary sensors, position sensors having a relatively short path length can include one or more windings shaped to resemble square waveforms. It can be desirable to provide and/or measure signals from the windings that resemble sinusoidal waveforms with varying coupling element position. Windings shaped to resemble square waveforms can include a large number (e.g., a theoretically infinite series) of spatial harmonics of the fundamental wavelength. Despite having windings resembling a square waveform, it can be possible to provide and/or measure a relatively smooth sinusoidal signal using the square waveform windings. For instance, sensors having square windings can be used with a coupling element having a length along the measurement direction of about 25% to about 50% of the wavelength of the windings. This can allow the coupling element to have an averaging effect resulting from the length of the second member along the measurement direction. As another example, a separation (e.g., an airgap) between the coupling element and the windings can contribute to a reduced interaction of the higher spatial harmonics (e.g., harmonics created by a square winding) with the coupling element. For instance, the higher spatial harmonics of the electromagnetic field can have a faster decay rate over the separation than lower spatial harmonics. As another example, multiple turns or loops can be employed in the windings to create multiple strengths of electromagnetic fields. For instance, a winding resembling a stepped square waveform can be employed to create multiple strengths of electromagnetic fields. As another example, the positions of turns in the windings can be adjusted to minimize certain spatial harmonics.

However, square waveform windings can be impractical for sensors having a relatively long path length. For instance, the length of the coupling element relative to the path length can be insufficient to provide the averaging effect. For instance, in some cases, a length of the coupling element along the measurement direction can be about 5% to about 25% of the wavelength of the windings. Additionally, it can be undesirable to increase the length of the coupling element.

One solution to this problem is to add more turns or steps to a square waveform winding. However, this can undesirably increase the size of the winding. For instance, this can manifest as an increase in the width of the sensor if the sensor is manufactured on a printed circuit board. In some cases, such as in sensors using square windings, the increase in width can be overcome (e.g., in rotary sensors) by using a coupling element having 50% of the coil wavelength which can be accommodated as multiple turns or loops providing a stepped square wave. However, in sensors using square windings and having a relatively low airgap, harmonics generated by the square windings can impact the sensor's linearity. Thus, in some cases, the use of square windings can present challenges associated with measuring a relatively smooth sinusoidal signal from the square windings.

Inductive sensors can also have windings with a shape resembling a sinusoidal waveform. For instance, the width of the winding (e.g., a winding on a printed circuit board) can vary in a sinusoidal manner along the length of the winding. Windings resembling a sinusoidal waveform can provide a number of advantages over square wave windings. For instance, the shape of the windings can contribute to the resemblance of the signal on the windings to a purely sinusoidal waveform (e.g., a sinusoidal waveform including minimal or no additional harmonic content). This can be particularly beneficial for cases when the second member is relatively short (e.g., about 5% to about 25% of the wavelength of the windings). As another example, this can be beneficial in cases where the airgap is relatively small.

In addition to ensuring that the signal resembles a sinusoidal waveform, it can also be desirable to maximize the transfer function of the position sensor. For example, the transfer function of the position sensor can be a ratio of signal strength at the receive aerial to signal strength at the transmit aerial. Maximizing the transfer function of the position sensor can facilitate detection and/or interpretation of signals at the windings. Additionally, some devices can include a minimum requirement for the transfer function. For example, a transfer function can be required to be greater than some threshold so that other components in a device (e.g., components used to drive and/or interpret signals at the windings) can operate effectively.

In some cases, a sensor having a large degree of separation (e.g. a large airgap) between the windings and the coupling element can have a low transfer function. Thus, to improve function, one can modify (e.g., increase) the transfer function and/or increase a signal strength. Increasing the signal strength can require increasing a voltage, current, power, or other electrical characteristic of the signal, which can be undesirable. For instance, increasing the signal strength can require more power and/or otherwise be impractical due to size constraints, safety limitations, or other considerations.

In addition to maximizing the transfer function, it can also be desirable to minimize the size of the sensor, especially the width of the sensor, which is largely determined by the width of the windings. Wider windings can have increased signal strength, providing better detection and/or interpretation of signals at the windings. This can result in a tradeoff between signal strength and sensor width.

According to example aspects of the present disclosure, one or more windings of a position sensor having a transmit aerial and/or a receive aerial can have a shape resembling a sinusoidal waveform with one or more scaled harmonics of the sinusoidal waveform added to the sinusoidal waveform. For example, a width of the one or more windings can vary along the length of the one or more windings according to a sinusoidal waveform combined with (e.g., added to) one or more scaled harmonics. This can allow for an improved signal strength and transfer function without requiring an increase in the width of the sensor.

The one or more scaled harmonics can include one harmonic and/or a plurality of harmonics of a sinusoidal waveform. The term "harmonic" can refer to a component basic waveform in a complex waveform represented as a superposition of one or more component basic waveforms, such as frequency components obtained by a Fourier transform. For instance, a harmonic of a sinusoidal waveform can refer to a waveform having the same structure (e.g., phase) as the sinusoidal waveform and having a period that is a multiple of the original period. For instance, the third harmonic of a sinusoidal waveform can complete its third period at the same point that the sinusoidal waveform completes its first period. According to example aspects of the present disclosure, the harmonics are defined spatially (i.e., along the length of the one or more windings).

In some embodiments, an amplitude associated with the one or more harmonics can be scaled. For instance, the amplitude of the one or more scaled harmonics can be a factor of the amplitude associated with the sinusoidal waveform. For instance, the amplitude of the one or more scaled harmonics can be an integer multiple of the amplitude of the sinusoidal waveform. Additionally and/or alternatively, the amplitude of the one or more scaled harmonics can be a fraction or non-integer multiple of the amplitude of the sinusoidal waveform. For example, in one example embodiment the amplitude of the one or more scaled harmonics can be scaled to $\frac{1}{6}^{th}$ of the amplitude of the sinusoidal waveform. In embodiments where the one or more scaled harmonics includes a plurality of harmonics, each of the plurality of harmonics can be scaled independently.

In embodiments having a plurality of windings, such as a plurality of windings in one or more of the transmit aerial and the receive aerial, each of the windings can have an associated phase. In some embodiments, the phase of each of the windings can be offset. For instance, one example embodiment according to the present disclosure includes three windings in one or more of the transmit aerial and the receive aerial. Each of the three windings can be 120 degrees out of phase. For example, a shape of a first of the three windings can correspond to a sinusoidal waveform and one or more scaled harmonics starting at zero degrees. A shape of a second of the three windings can correspond to the sinusoidal waveform and one or more scaled harmonics starting at 120 degrees. A shape of a third of the three windings can correspond to the sinusoidal waveform and one or more scaled harmonics starting at 240 degrees or −120 degrees.

The windings can be arranged in any suitable configuration. For instance, in one example embodiment, the windings are arranged in a Y or star configuration, such that a common node is coupled to each of the windings. In some embodiments, the common node is coupled to a reference, such as ground. In some embodiments, one or more capacitors or other reactive elements are included between the common node and the reference. For instance, in this configuration a differential signal at the windings can be defined between nodes of the windings that are not coupled to the common node. For instance, an embodiment having three nodes in a Y or star configuration can have three nodes that are not coupled to the common ground, and differential signals can be defined between pairs of the three nodes.

Each of the windings can be arranged in parallel spaced configuration. For example, each of the windings can be arranged on a unique layer of a multi-layer circuit board, such as a printed circuit board. For example, if the windings are arranged circularly, such as for detection of rotational motion, the windings can be arranged concentrically and spaced (e.g., across multiple layers) along a direction defined by the depth of the multi-layer circuit board. As another example, if the windings are arranged linearly, such as for detection of linear motion, the windings can be arranged along the same axis or direction. The windings may be arranged such that the directions defined by the widths of each of the windings are substantially parallel. For example, a plane defined by a sinusoidal waveform and one or more scaled harmonics in each of the windings can be parallel.

Each of the windings can have about the same number of turns or periods. For example, each winding can traverse about one period of the sinusoidal waveform. As another example, each winding can traverse about two periods of the sinusoidal waveform. As another example, each winding can traverse a non-integer period of the sinusoidal waveform, such as about one and a half periods of the sinusoidal waveform.

Each of the windings can have the same one or more scaled harmonics incorporated into its shape. For instance, in one example embodiment, the one or more scaled harmonics can be a third harmonic of the sinusoidal waveform. In embodiments having three windings in an aerial, each winding being about 120 degrees out of phase with the other windings in the aerial, it can be beneficial to include the third harmonic as the contribution to a receive signal from the scaled harmonic component in the windings can be naturally eliminated in differential measurements. For instance, although the fundamental wavelengths of each winding are 120 degrees out of phase, the third harmonics are in phase (i.e., have zero degrees of phase separation). Thus, when differential signals (such as between pairs of windings) are provided or measured, the third harmonic can be subtracted out and the differential signal can be substantially identical to a corresponding signal in a position sensor having purely sinusoidally-shaped windings. Similarly, embodiments having more or fewer than three windings can beneficially include other naturally eliminated harmonics according to the present disclosure. This can be particularly advantageous in embodiments having any odd number of windings, such as three windings, five windings, etc.

Aspects of the present disclosure can provide a number of technical effects and benefits. For instance, one example technical effect realized by systems and methods according to aspects of the present disclosure can be to provide an increase in signal strength (e.g. receive signal strength) and/or transfer function relative to a purely sinusoidal winding without a corresponding increase in the required width of the winding. For example, the increased signal strength can manifest as a greater amplitude associated with an oscillating signal. As another example, the increased signal strength can manifest as a stronger interaction at the coupling element. Including one or more naturally eliminated harmonics with appropriate scaling can allow for an increase in the amplitude of the fundamental wavelength of the winding without requiring an increase in width of the winding by including the contribution from the one or more harmonics. For example, in embodiments where the one or more scaled harmonics include a third harmonic scaled to $\frac{1}{6}^{th}$ of a total amplitude, it can be possible to achieve a signal strength of up to about 1.15 times that of a purely sinusoidal winding having the same width.

For instance, a spatial Fourier decomposition of a purely sinusoidal winding is a single waveform at the same frequency as the winding whose amplitude is the width of the winding. This is referred to as the "fundamental" of the winding. By incorporating the one or more scaled harmonics into the winding, a spatial Fourier decomposition of the winding can have additional components related to the one or more scaled harmonics. According to example aspects of the present disclosure, the one or more scaled harmonics can be independent from the fundamental in the Fourier domain while having a limiting effect on the width of the winding in the spatial domain. For instance, the one or more scaled harmonics can allow for an increase in the amplitude of the fundamental, which can allow for an increase in sensitivity of the winding and/or improved response characteristics. Without incorporating the one or more scaled harmonics, the increase in amplitude of the fundamental could manifest as an increased width of the winding. However, the one or more scaled harmonics can be selected to counteract the fundamental at certain points in the spatial domain (e.g., at points having values at around the amplitude of the fundamental or otherwise near the maximum width, height, value, etc. of the fundamental) to allow for the increase in the amplitude of the fundamental to be achieved without requiring an increased width of the winding.

Compared especially to a purely sinusoidal winding, systems and methods according to the present disclosure can provide several advantages. For example, windings configured according to example aspects of the present disclosure can allow for a longer measurement path associated with the position sensor, as the greater signal strength allows the coupling element to have a reduced length in the measurement direction. As another example, the windings configured according to example aspects of the present disclosure can allow for more reliable detection of the second member resulting from the increased signal strength. As another example, the windings configured according to example aspects of the present disclosure can allow for a receive signal to be induced in one or more receive windings by a coupling element at a farther distance from the one or more receive windings. As another example, the windings configured according to example aspects of the present disclosure can allow for a decrease in the amount of power used at the transmit winding(s), as a relatively weaker signal (e.g. having a lower voltage, having a lower current, consuming less power, etc.) can achieve comparable performance.

Another technical effect realized by systems and methods according to example aspects of the present disclosure is to provide an increase in signal strength relative to a purely sinusoidal winding while maintaining the same response characteristics associated with the purely sinusoidal winding. This is referred to as the "linearity." In other words, a change in a position signal resulting from a change in position between a first member and a second member in systems with windings having a purely sinusoidal shape and systems with windings configured according to the present disclosure can be about identical. In other words, the linearity of the position signal with respect to distance is maintained. For instance, the position signal can vary in a linear relationship with position. It can be desirable to maintain the linearity to allow for easy retrofitting of existing systems and/or to provide a known and accurate method of detection of the relative distance.

One example aspect of the present disclosure is directed to an inductive position sensor configured to detect relative position between a first member and a second member. The inductive position sensor may include a transmit aerial configured to be disposed on the first member. The inductive position sensor may include a receive aerial configured to be disposed on the first member. The inductive position sensor may include processing circuitry configured to provide one or more signals indicative of the relative position between the first member and the second member based on a receive signal induced in the receive aerial resulting from a signal provided to the transmit aerial. One or more of the transmit aerial and the receive aerial may include one or more windings. A shape of the one or more windings can be a combination of a sinusoidal waveform and one or more scaled harmonics of the sinusoidal waveform.

In some embodiments, the one or more windings can be an odd number of windings. In some embodiments, the shape of the one or more windings is such that the one or more signals indicative of the relative position between the first member and the second member varies linearly with the relative position. For instance, in some embodiments, the one or more scaled harmonics are selected based at least in part on a number of windings in the one or more windings such that the one or more scaled harmonics is eliminated at the receive signal. For instance, in some embodiments, the one or more scaled harmonics includes a third harmonic of the sinusoidal waveform. For instance, in some embodiments, an amplitude of the one or more scaled harmonics is about $\frac{1}{6}^{th}$ of an amplitude of the sinusoidal waveform. In some embodiments, the one or more windings are connected in a Y or star configuration. In some embodiments, the second member can be magnetic or conductive material. In some embodiments, a length of the second member is between about 5% and about 25% of a wavelength of one or more of the one or more windings.

Another example aspect of the present disclosure is directed to a method of determining a relative distance between a first member and a second. The method can include providing a transmit signal to a transmit aerial configured to be disposed on the first member. The method can include receiving, at a receive aerial configured to be disposed on the first member, a receive signal resulting from the transmit signal. The method can include determining one or more signals indicative of the relative position between the first member and the second member based on the receive signal. The method can include communicating the one or more signals indicative of the relative position between the first member and the second member. One or more of the transmit aerial and the receive aerial can include one or more windings. A shape of the one or more windings can be a combination of a sinusoidal waveform and one or more scaled harmonics of the sinusoidal waveform.

In some embodiments, the one or more windings includes three windings, each winding in the three windings being separated by about 120 degrees of phase separation. In some embodiments, the one or more windings are connected in a Y or star configuration. In some embodiments, the one or more scaled harmonics includes a third harmonic of the sinusoidal waveform. In some embodiments, an amplitude of the one or more scaled harmonics is about $\frac{1}{6}^{th}$ of an amplitude of the sinusoidal waveform.

Referring now to the FIGS., example embodiments of the present disclosure will now be set forth. Example aspects of the present disclosure are discussed with reference to incorporating scaled harmonics into one or more receive windings (i.e., windings on the receive aerial) for the purposes of illustration. One of ordinary skill in the art will recognize that the aspects of the present disclosure can be applied to the transmit aerial, the receive aerial, and/or any additional aerials or windings thereof without departing from the scope of the present disclosure. For instance, in some embodiments, the transmit aerial can include one or more transmit windings having a shape resembling a sinusoidal waveform with one or more scaled harmonics of the sinusoidal waveform added to the sinusoidal waveform.

FIG. 1 depicts a schematic of select portions of an example position sensor 100 configured to detect relative position between a first member and a second member (not shown in FIG. 1), according to example embodiments of the present disclosure. The position sensor 100 can include an inductive sensor element 101 configured to be coupled to the first member (not shown in FIG. 1). In some embodiments, the inductive sensor element 101 can include a transmit aerial 102 and a receive aerial 103, which can include one or more receive windings 104, 106, 108.

In some embodiments, a coupling element 107 can be disposed on at least a portion of the second member. The coupling element 107 can include magnetic or conductive material such that movement of the first member relative to the second member can alter signals induced in the receive aerial 103 based on interaction between the coupling element 107 and an electromagnetic field generated by the transmit aerial 102.

The transmit aerial 102 and/or one or more receive windings 104, 106, 108 can be electrically connected to respective terminals of processing circuitry 110. In this example, the processing circuitry 110 is in the form of a semiconductor integrated circuit device, such as an Application Specific Integrated Circuit (ASIC) or an Application Specific Standard Product (ASSP). In other examples, the processing circuitry 110 can use multiple interconnected devices and/or can be implemented using one or more suitable components (e.g., electronic components, such as discrete electronic components).

As shown in FIG. 1, the processing circuitry 110 can include a transmission (TX) drive stage 112, which can be configured to generate an oscillating electrical signal for supply to the transmit aerial 102. In this example, the TX drive stage 112 can be a free running oscillator that generates an oscillating electrical signal at a drive frequency determined by the inductance of the transmit aerial 102 and the capacitance of one or more capacitor(s) 114 connected in parallel to the transmit aerial 102. This drive frequency is normally selected to be in the range of about 100 kHz to about 6 MHz. The peak amplitude of the oscillating electrical signal can range from about 10 mA to 1,000 mA (e.g., about 50 mA). As used herein, the use of the term "about" in conjunction with a numerical value is intended to refer to within 20% of the stated numerical value.

Supplying an oscillating current to the transmit aerial 102 induces electromotive forces in the one or more receive windings 104, 106, 108 of the receive aerial 103, which can induce signals (e.g., current, voltage, etc.) in the one or more receive windings 104, 106, 108. As shown in FIG. 1, the one or more receive windings 104, 106, 108 are separate windings such that separate signals can be induced in each of the one or more receive windings 104, 106, 108. Each of the one or more receive windings 104, 106, 108 are electrically connected to separate terminals of the processing circuitry 110, with the signals in each of the one or more receive windings 104, 106, 108 being processed to provide one or more output signals 123, 125, 127. The relative magnitudes and polarities of the one or more output signals 123, 125, 127 are indicative of the relative position (e.g., relative linear displacement) of the first member and the second member. In some embodiments, the one or more receive windings 104, 106, 108 can be connected in a Y or star configuration. An example Y or star configuration is discussed with reference to FIG. 2.

Differential measurements of signals can be obtained at the differential measurements stage 113. In the embodiment of FIG. 1, the differential measurements stage is illustrated as occurring before EMC filtering stage 115. It should be understood that the differential measurements stage 113 can be included before and/or after any stage in the processing circuitry 110. For example, the differential measurements stage 113 can be included after EMC filtering stage 115. As another example, the differential measurements stage 113 can be included after demodulation stage 117. As another example, the differential measurements stage 113 can be included after low pass filtering stage 119.

At differential measurements stage 113, differential measurements can be obtained between any of the input signals (e.g., signals from windings 104, 106, 108), which are referred to as a, b, and c, respectively, for the purposes of illustration. It should be understood that differential measurements can be defined between any number of input signals. For example, in embodiments having three windings spaced with 120 degrees of phase separation where the one or more scaled harmonics is a third harmonic scaled at $\frac{1}{6}^{th}$ the total amplitude of the sinusoidal waveform, a linear response with respect to relative position between a first member and a second member according to example aspects of the present disclosure can be obtained by taking differential measurements D1=a−b, D2=b−c, and D3=c−a. For instance, although the fundamentals of the windings are 120 degrees out of phase, the third harmonics can be in phase and cancel out in the differential measurements.

Signals in the one or more receive windings 104, 106, 108 may go through an EMC filtering stage 115, which may reduce signal components at frequencies away from the drive frequency. Such signal components may be caused, for example, by interference from electrical signals generated by other nearby electrical components.

The filtered electrical signal may then go through a demodulation stage 117 in which the filtered electrical signal can be mixed with a demodulation signal from the TX drive stage 112. The demodulation signal can be in phase with the drive signal. In some embodiments, the signals from some or all of the one or more receive windings 104, 106, 108 can be about 90° and/or about 180° out of phase with the drive signal.

In some embodiments, the demodulated electrical signal can pass through a low pass filtering stage 119 to remove high frequencies from the demodulated electrical signal. The demodulated electrical signal can then pass through gain and output buffer stage 121, which allows an adjustable gain to be applied before the output signals 123, 125, 127 are output by the processing circuitry 110. For instance, the output signals 123, 125, 127 can be output by the processing circuitry in any suitable manner. For example, the output signals 123, 125, 127 can be output as analogue voltage levels, such as three analogue voltage levels as shown in FIG. 1. As another example, the output signals 123, 125, 127 can be digitized. In some embodiments, position can be calculated based on the output signals 123, 125, 127. For instance, the position can be calculated and output, for example, as a single analogue voltage, PWM signal, or by various digital protocols. As another example, the output signals 123, 125, 127 (e.g., digitized output signals) can be transformed into sinusoidal outputs (e.g., two sinusoidal outputs), such as a sine and cosine output. For instance, the output signals 123, 125, 127 can be provided to determine a position associated with a second member.

In some embodiments, windings in the transmit aerial 102 and the one or more receive windings 104, 106, 108 in the receive aerial 103 can be formed by conductive traces. The conductive traces can be formed on a printed circuit board or other substrate that is positioned on and/or coupled to the first member. For instance, the printed circuit board or other substrate can form a multilayer structure. In some embodiments, the intermediate coupling element 107 can include a conductive material (e.g., pattern of conductive material) located on the second member. Additionally and/or alternatively, in some embodiments, windings can be formed by wire wound on a coil former. In some embodiments, the turns per unit length can vary smoothly to create the coil shape.

Figure 2:
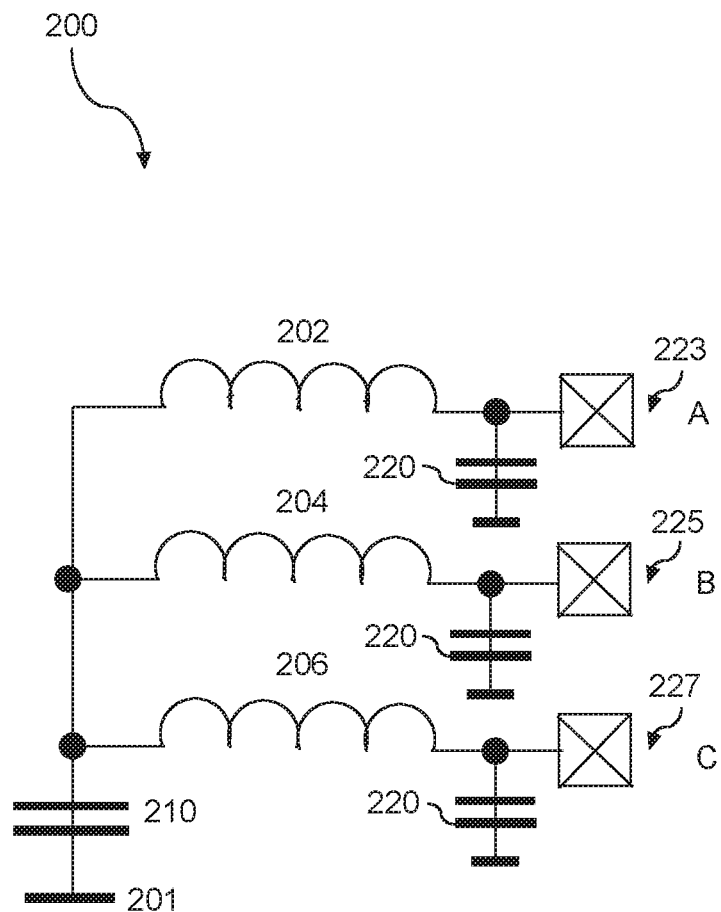
FIG. 2 depicts an example configuration of windings according to example embodiments of the present disclosure.

FIG. 2 illustrates an example Y or star configuration 200 of one or more windings 202, 204, 206 according to example aspects of the present disclosure. For instance, the one or more windings 202, 204, 206 can correspond to the one or more receive windings 104, 106, 108 of FIG. 1. For example, the Y or star configuration 200 can be included at and/or before differential measurements 113. The configuration of FIG. 2 is illustrated with three windings 202, 204, 206 for the purpose of illustration. One or ordinary skill in the art will recognize that the configuration of FIG. 2 can be applied to any suitable number of windings.

As illustrated in FIG. 2, a node of each of the windings 202, 204, 206 is coupled to a common node or reference 201 (e.g. ground). In some embodiments, one or more capacitors or reactive elements 210 can be coupled between the reference 201 and the windings 202, 204, 206. The other nodes of each of the windings can form signals 223, 225, 227. For example, in some embodiments, the signals 223, 225, 227 can correspond to the signals 123, 125, 127 of FIG. 1. In some embodiments, one or more capacitors or reactive elements 220 can be coupled at the other nodes.

Differential measurements can be obtained between any of the signals 223, 225, 227, which are referred to as a, b, and c, respectively, for the purposes of illustration. For example, in embodiments having three windings spaced with 120 degrees of phase separation where the one or more scaled harmonics is a third harmonic scaled at $\frac{1}{6}^{th}$ the total amplitude of the sinusoidal waveform, a linear response with respect to relative position between a first member and a second member according to example aspects of the present disclosure can be obtained by taking differential measurements D1=a−b, D2=b−c, and D3=c−a. For instance, although the fundamentals of the windings are 120 degrees out of phase, the third harmonics can be in phase and cancel out in the differential measurements. In this manner, the differential measurements can vary linearly with the relative position.

The differential measurements can be processed to determine a relative position between the first member and the second member. For instance, the differential measurements can be combined using an a tan or angle function. For instance, the differential measurements can be combined by Clarke Transform. One example method of combining the differential measurements to determine position is given by:

$$\text{position} = \text{angle}\left(D1 - \frac{D2}{2} - \frac{D3}{2}, \frac{\sqrt{3}}{2}D2 - \frac{\sqrt{3}}{2}D3\right)$$

For instance, according to the example embodiment described above, the linearity between the differential measurements and the relative position can be maintained. In other words, the atan or angle function can vary linearly (e.g., according to a linear relationship) with relative position. This can allow the one or more scaled harmonics to have intrinsically no impact on the linearity of the position response, as it can be naturally eliminated at the differential measurements.

Figure 3:
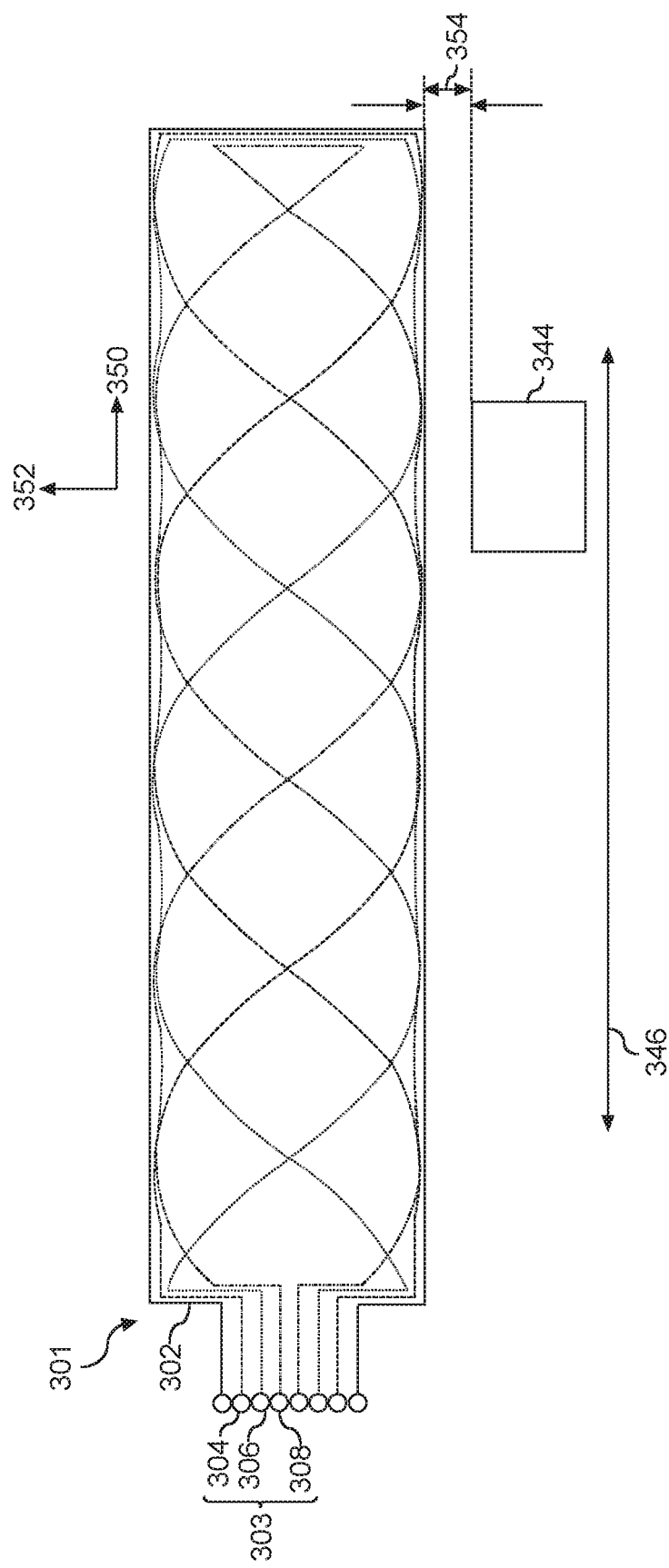
FIG. 3 depicts an example inductive position sensor according to example embodiments of the present disclosure.

FIG. 3 depicts one example configuration of an inductive sensor element 301 having a transmit winding 302 and a receive aerial 303 having one or more receive windings 304, 306, 308. A shape of the one or more receive windings 304, 306, 308 is a combination of a sinusoidal waveform and one or more scaled harmonics of the sinusoidal waveform according to aspects of the present disclosure. For example, a width of the one or more receive windings 304, 306, 308 can vary along the length of the one or more receive windings 304, 306, 308 according to a sinusoidal waveform combined with (e.g., added to) one or more scaled harmonics. This can allow for an improved signal strength and transfer function without requiring an increase in the width of the receive windings 304, 306, 308.

The one or more scaled harmonics can include one harmonic and/or a plurality of harmonics of a sinusoidal waveform defining the shape of the one or more receive windings 304, 306, 308. According to example aspects of the present disclosure, the harmonics are defined spatially (i.e., along the length of the one or more receive windings 304, 306, 308).

In some embodiments, an amplitude associated with the one or more harmonics can be scaled. For instance, the amplitude of the one or more scaled harmonics can be a factor of the amplitude associated with the fundamental sinusoidal waveform. For instance, the amplitude of the one or more scaled harmonics can be an integer multiple of the amplitude of the sinusoidal waveform. Additionally and/or alternatively, the amplitude of the one or more scaled harmonics can be a fraction or non-integer multiple of the amplitude of the sinusoidal waveform. For example, in one example embodiment the amplitude of the one or more scaled harmonics can be scaled to $\frac{1}{6}^{th}$ of the amplitude of the sinusoidal waveform. In embodiments where the one or more scaled harmonics includes a plurality of harmonics, each of the plurality of harmonics can be scaled independently.

Each of the receive windings 304, 306, 308 can have an associated phase. In some embodiments, the phase of each of the receive windings 304, 306, 308 can be offset. For instance, each of the receive windings 304, 306, 308 can be 120 degrees out of phase. For example, a shape of receive winding 308 can correspond to a sinusoidal waveform and one or more scaled harmonics starting at zero degrees. A shape of receive winding 304 can correspond to the sinusoidal waveform and one or more scaled harmonics starting at 120 degrees. A shape of receive winding 306 can correspond to the sinusoidal waveform and one or more scaled harmonics starting at 240 degrees or −120 degrees.

The receive windings 304, 306, 308 can be arranged in any suitable configuration. For instance, in one example embodiment, the receive windings 304, 306, 308 are arranged in a Y or star configuration, such that a common node is coupled to each of the receive windings 304, 306, 308. An example Y or star configuration is discussed with reference to FIGS. 2 and 4. In some embodiments, the common node is coupled to a reference, such as ground. In some embodiments, one or more capacitors or other reactive elements are included between the common node and the reference. For instance, in this configuration a differential signal at the windings can be defined between nodes that are not coupled to the common node. For instance, an embodiment having three nodes in a Y or star configuration can have three nodes that are not coupled to the common ground, and differential signals can be defined between pairs of the three nodes.

Each of the receive windings 304, 306, 308 can be arranged in parallel. For example, each of the receive windings 304, 306, 308 can be arranged on a unique layer of a multi-layer circuit board, such as a printed circuit board. For example, if the windings are arranged linearly, such as for detection of linear motion, the receive windings 304, 306, 308 can be arranged along the same axis or direction (e.g., along longitudinal direction 350). The windings may be arranged such that the directions defined by the widths of each of the receive windings 304, 306, 308 are substantially parallel. For example, a plane defined by a sinusoidal waveform and one or more scaled harmonics in each of the receive windings 304, 306, 308 can be parallel. For instance, each of the receive windings 304, 306, 308 may be arranged parallel to a plane defined by longitudinal direction 350 and lateral direction 352.

Each of the receive windings 304, 306, 308 can have about the same number of turns or periods. For example, each of the receive windings 304, 306, 308 can traverse about one period of the sinusoidal waveform. As another example, each of the receive windings 304, 306, 308 can traverse about two periods of the sinusoidal waveform. As another example, each of the receive windings 304, 306, 308 can traverse a non-integer period of the sinusoidal waveform, such as about one and a half periods of the sinusoidal waveform.

Each of the receive windings 304, 306, 308 can have the same one or more scaled harmonics incorporated into its shape. For instance, in one example embodiment, the one or more scaled harmonics can be a third harmonic of the sinusoidal waveform. For instance, each receive winding 304, 306, 308 can be about 120 degrees out of phase with the other receive windings 304, 306, 308. It can be beneficial to include the third harmonic in the receive windings 304, 306, 308 as the contribution to a receive signal from the scaled harmonic component in the receive windings 304, 306, 308 can be naturally eliminated in differential signals at the receive windings 304, 306, 308. For instance, although the fundamental wavelengths of each receive winding 304, 306, 308 are 120 degrees out of phase, the third harmonics are in phase (i.e., have zero degrees of phase separation). Thus, when differential signals between the receive windings 304, 306, 308 are provided or measured, the third harmonic can be subtracted out and the differential signal can be substantially identical to a corresponding signal in a position sensor having purely sinusoidally-shaped windings. This is discussed in further detail with reference to FIGS. 2 and 4-5.

The receive aerial 303 is illustrated with respect to three receive windings 304, 306, 308 for the purposes of illustration. One or ordinary skill in the art will understand that the receive aerial 303 can include any suitable number of receive windings, such as an odd number of receive windings.

The transmit winding 302 and the one or more receive windings 304, 306, 308 can be coupled to a substrate, such as a printed circuit board. The transmit winding 302 and the one or more receive windings 304, 306, 308 can be configured as a multilayer structure with different components or portions of the transmit aerial (e.g., transmit winding 302) or receive aerial 303 (e.g., one or more receive windings 304, 306, 308) being arranged in different layers of a printed circuit board or other substrate.

According to example aspects of the present disclosure, a relative position can be determined between a first member (not shown in FIG. 3) including the inductive sensor element 301 and a second member (not shown in FIG. 3) including a coupling element 344. For instance, the coupling element 344 may be the entire second member. The coupling element 344 may be a portion of the second member that can interact with the transmit winding 302 and/or the one or more receive windings 304, 306, 308. The inductive sensor element 301 and the coupling element 344 can be spaced apart by a spacing distance 354 defined in a lateral direction 352 that is perpendicular to a longitudinal direction 350. In some embodiments, a length of the coupling element 344 along the longitudinal direction 350 can be about 5% to about 35% of the wavelength of the transmit winding 302 and/or the one or more receive windings 304, 306, 308.

Movement of the first member relative to the second member/coupling element 344 in the longitudinal direction 350 (e.g., as illustrated by arrow 346 in FIG. 3) can be detected based on differences in respective electromagnetic properties (e.g., induced Eddy currents, magnetic permeability, etc.) of the second member/coupling element 344. For example, the inductive sensor element 301 can detect eddy currents in the coupling member 344. For example, movement along the longitudinal direction 350 can alter a current induced in the one or more receive windings 304, 306, 308 based on interaction between the coupling element 344 and an electromagnetic field generated by the transmit winding 302.

Figure 4:
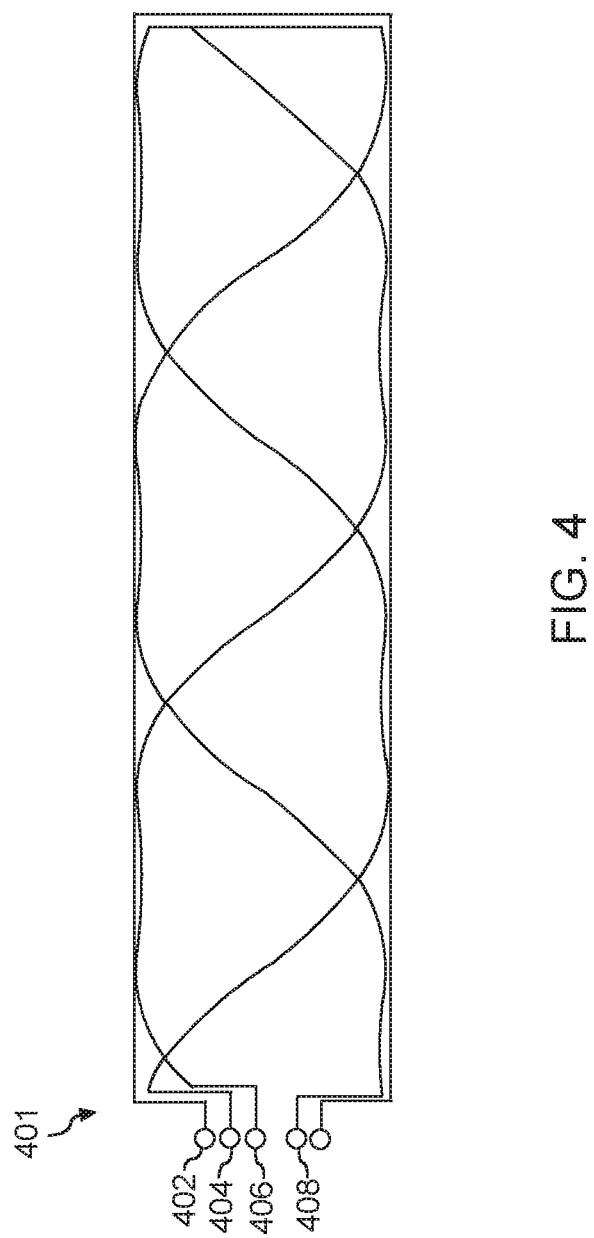
FIG. 4 depicts an example inductive position sensor according to example embodiments of the present disclosure.

FIG. 4 depicts an inductive sensor element 401 according to example aspects of the present disclosure. The inductive sensor element 401 can be employed in a similar manner to inductive sensor element 301 of FIG. 3. For instance, the inductive sensor element 401 can be used to determine a relative position between a first member and a second member.

The inductive sensor element 401 can include one or more windings. For instance, the inductive sensor element 401 includes a transmit winding 402 and one or more receive windings 404, 406, 408. A shape of the one or more receive windings 404, 406, 408 is a combination of a sinusoidal waveform and one or more scaled harmonics of the sinusoidal waveform according to aspects of the present disclosure. For example, a width of the one or more receive windings 404, 406, 408 can vary along the length of the one or more receive windings 404, 406, 408 according to a sinusoidal waveform combined with (e.g., added to) one or more scaled harmonics. This can allow for an improved signal strength and transfer function without requiring an increase in the width of the receive windings 404, 406, 408.

The one or more scaled harmonics can include one harmonic and/or a plurality of harmonics of a sinusoidal waveform defining the shape of the one or more receive windings 404, 406, 408. According to example aspects of the present disclosure, the harmonics are defined spatially (i.e., along the length of the one or more receive windings 404, 406, 408).

In some embodiments, an amplitude associated with the one or more harmonics can be scaled. For instance, the amplitude of the one or more scaled harmonics can be a factor of the amplitude associated with the fundamental sinusoidal waveform. For instance, the amplitude of the one or more scaled harmonics can be an integer multiple of the amplitude of the sinusoidal waveform. Additionally and/or alternatively, the amplitude of the one or more scaled harmonics can be a fraction or non-integer multiple of the amplitude of the sinusoidal waveform. For example, in one example embodiment the amplitude of the one or more scaled harmonics can be scaled to $\frac{1}{6}^{th}$ of the amplitude of the sinusoidal waveform. In embodiments where the one or more scaled harmonics includes a plurality of harmonics, each of the plurality of harmonics can be scaled independently.

Each of the receive windings 404, 406, 408 can have an associated phase. In some embodiments, the phase of each of the receive windings 404, 406, 408 can be offset. For instance, each of the receive windings 404, 406, 408 can be 120 degrees out of phase. For example, a shape of receive winding 408 can correspond to a sinusoidal waveform and one or more scaled harmonics starting at zero degrees. A shape of receive winding 404 can correspond to the sinusoidal waveform and one or more scaled harmonics starting at 120 degrees. A shape of receive winding 406 can correspond to the sinusoidal waveform and one or more scaled harmonics starting at 240 degrees or −120 degrees.

The receive windings 404, 406, 408 can be connected in a Y or star configuration. In the embodiment of FIG. 4, the receive windings 404, 406, 408 are connected at a common end to form the Y or star configuration at the common end of the windings 404, 406, 408 (e.g., alternatively to being connected in the Y or star configuration at electrical terminals connected to the windings 404, 406, 408, such as in the configuration of FIG. 2). For instance, in some embodiments the common end of the windings 404, 406, 408 can be connected to a reference, such as ground.

Figure 5:
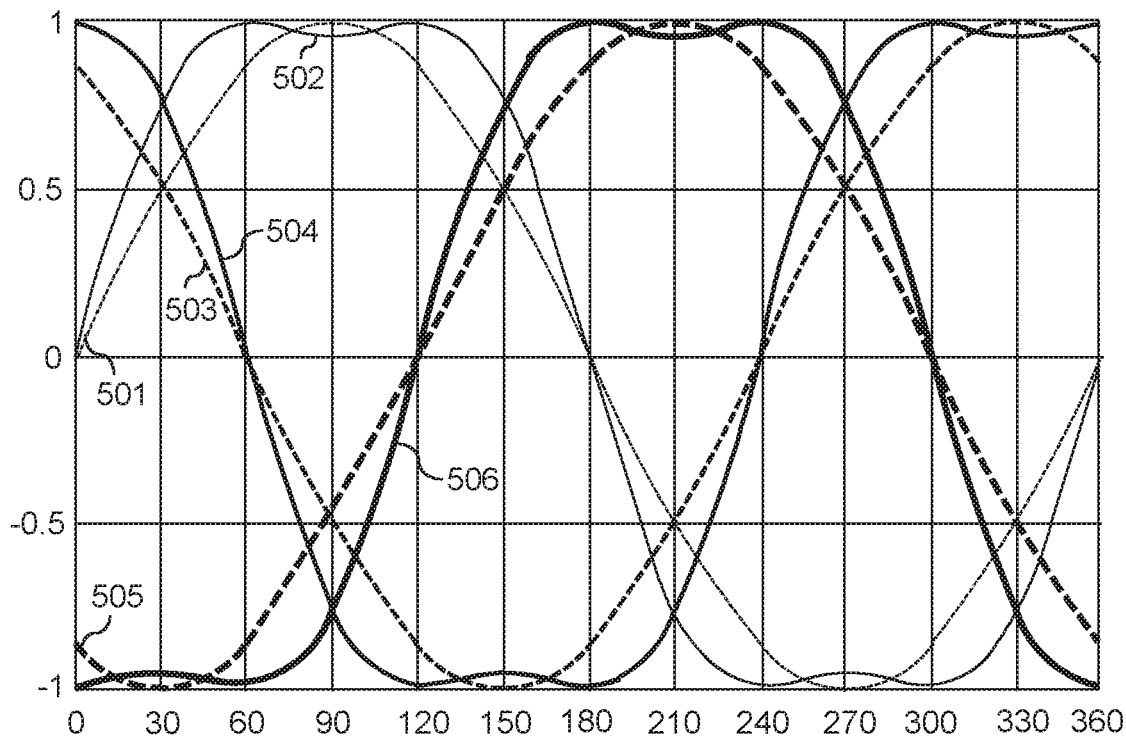
FIG. 5 depicts a plot of example sinusoidal waveforms and corresponding distorted waveforms having added one or more scaled harmonics according to example embodiments of the present disclosure.

FIG. 5 depicts a plot of example sinusoidal waveforms 501, 503, 505 and distorted waveforms 502, 504, 506. For instance, the distorted waveforms 502, 504, 506 can be the sinusoidal waveforms 501, 503, 505 having added one or more scaled harmonics according to example embodiments of the present disclosure and having increased amplitude of the fundamental waveform. For example, FIG. 5 includes three distorted waveforms 502, 504, 506, each 120 degrees out of phase, having an increased fundamental amplitude and having an added third harmonic scaled to $\frac{1}{6}^{th}$ of the total amplitude of the fundamental component sinusoidal waveforms 501, 503, 505.

Windings configured according to the waveforms illustrated in FIG. 5 can be particularly advantageous as the configuration illustrated in FIG. 5 can allow for a minimized maximum width associated with the distorted sinusoidal waveforms. The distorted waveforms 502, 504, 506 have increased fundamental amplitude compared to the sinusoidal waveforms 501, 503, 505. However, as illustrated in FIG. 5, the distorted waveforms 502, 504, 506 occupy about the same width compared to the sinusoidal waveforms 501, 503, 505.

For instance, a spatial Fourier decomposition of the sinusoidal waveforms 501, 503, 505 is a single waveform at the same frequency as the sinusoidal waveforms 501, 503, 505 whose amplitude is the amplitude of the sinusoidal waveforms 501, 503, 505. This is referred to as the "fundamental" of the sinusoidal waveforms 501, 503, 505. By incorporating the one or more scaled harmonics into the distorted waveforms 502, 504, 506, a Fourier decomposition of the distorted waveforms 502, 504, 506 can include the one or more scaled harmonics. According to example aspects of the present disclosure, the one or more scaled harmonics can be independent from the fundamental in the Fourier domain while having a limiting effect on the amplitude (e.g., maximum amplitude) of the distorted waveforms 502, 504, 506.

For instance, the one or more scaled harmonics can allow for an increase in the amplitude of the fundamental without requiring an increase in width, which can allow for an increase in response characteristics of windings according to the distorted waveforms 502, 504, 506 while maintaining spatial characteristics. Without incorporating the one or more scaled harmonics, the increase in amplitude of the fundamental could manifest as an increased amplitude of the sinusoidal waveforms 501, 503, 505. However, the one or more scaled harmonics can be selected to counteract the fundamental at certain points in the spatial domain (e.g., at points around the maximum amplitude of the fundamental) to allow for the increase in the amplitude of the fundamental to be achieved without requiring an increased width of the distorted waveforms 502, 504, 506.

For instance, the configuration illustrated in FIG. 5 incorporates a third harmonic of the sinusoidal waveforms 501, 503, 505 scaled to $\frac{1}{6}^{th}$ of the total amplitude. If the distorted waveforms 502, 504, 506 did not include the scaled third harmonic, they would substantially mimic the sinusoidal waveforms 501, 503, 505 but have a maximum amplitude at 1.15 instead of 1. However, incorporating the third harmonic can counteract the distorted waveforms 502, 504, 506 at points near their maximum values or amplitudes (e.g., around 90 degrees and 270 degrees for distorted waveform 502) such that the distorted waveforms 502, 504, 506 and sinusoidal waveforms 501, 503, 505 can both have a maximum amplitude of 1, as illustrated in FIG. 5, with the distorted waveforms 502, 504, 506 having a greater fundamental. Thus, a winding configured according to the distorted waveforms 502, 504, 506 can have improved signal response characteristics relative to a winding configured according to the sinusoidal waveforms 501, 503, 505 without requiring a larger width.

Figure 6:
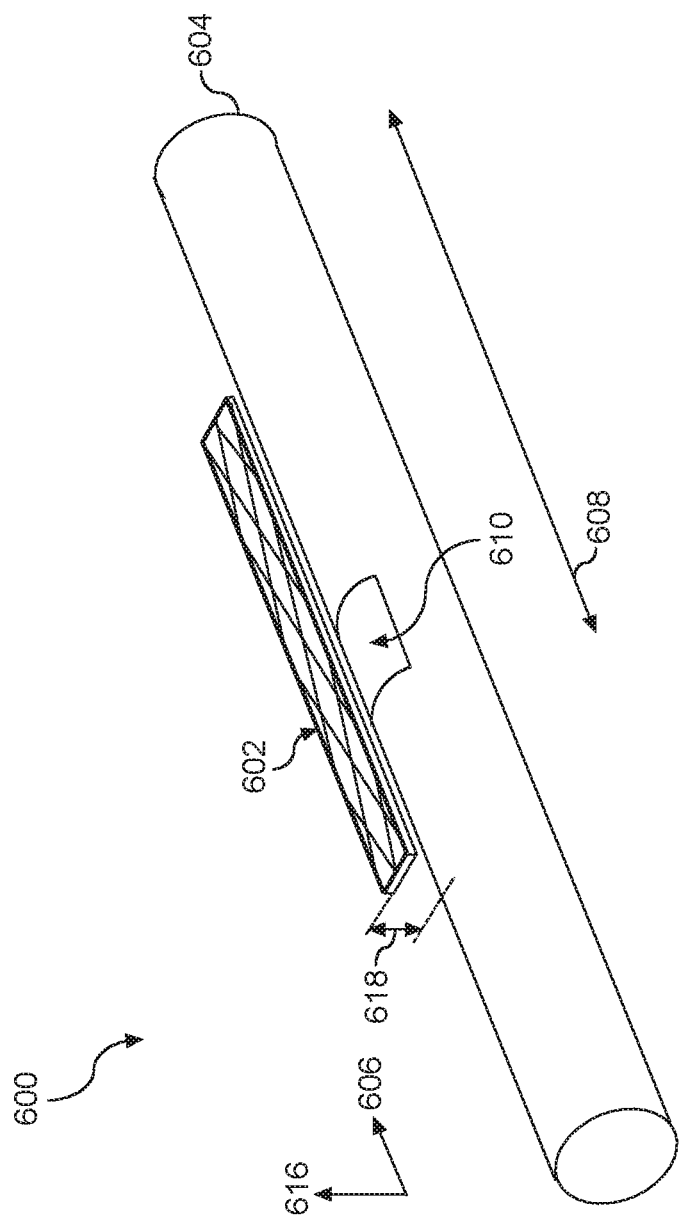
FIG. 6 depicts an example inductive position sensor according to example embodiments of the present disclosure.

FIG. 6 illustrates a position sensor assembly 600 for linear position sensing according to example embodiments of the present disclosure. The position sensor assembly 600 can be configured to detect relative movement in a longitudinal direction 606 (represented by arrow 608) between a sensor element 602 and a member 604. The member 604 can include a coupling element 610. For instance, the coupling element 610 can include one or more portions of conductive and/or magnetic material. The sensor element 602 can be coupled to an additional member (not shown in FIG. 6).

The sensor element 602 can include one or more windings (e.g., transmit and sensor windings), for example as described above with reference to FIGS. 2 through 5. For instance, a shape of the one or more windings can be a combination of a sinusoidal waveform and one or more scaled harmonics of the sinusoidal waveform according to aspects of the present disclosure. The sensor element 602 can include a printed circuit board on which the windings are formed as conductive traces, for example as described with reference to FIGS. 2 through 5. Sensor element 602 can include any suitable number of windings, such as an odd number of transmit and/or receive windings. A greater number of windings may also be employed (e.g., three or more), within various transmit and receive configurations. For example, multiple distorted sinusoidally shaped windings may be translated (e.g., about 120 degrees for three windings or about 72 degrees for five windings) relative to each other. The processing circuitry may be configured to detect mutual or self-inductance properties of the windings.

The sensor element 602 (e.g., including the receive winding and/or transmit winding) can be spaced apart by a spacing distance 618 from the member 604 and/or the coupling element 610 in a lateral direction 616 that is perpendicular to the longitudinal direction 606. In some embodiments, the spacing distance 618 may range from about 1 mm to about 30 mm.

Figure 7:
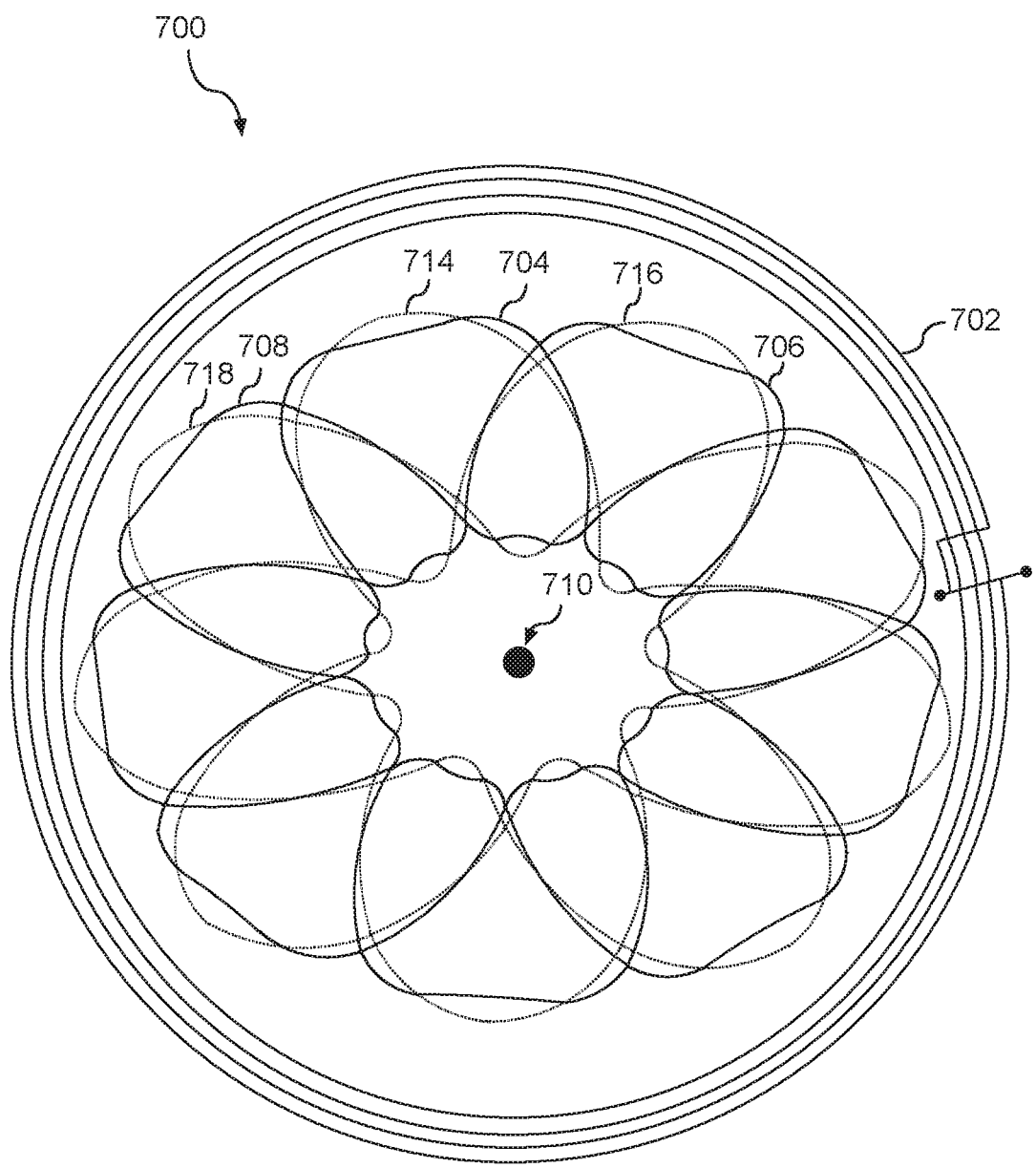
FIG. 7 depicts an example inductive position sensor according to example embodiments of the present disclosure.

FIG. 7 illustrates one embodiment of a position sensor assembly 700 for rotational position sensing according to example aspects of the present disclosure. The position sensor assembly 700 can include a transmit winding 702 and one or more receive windings 704, 706, 708. A shape of the one or more receive windings 704, 706, 708 is a combination of a sinusoidal waveform and one or more scaled harmonics of the sinusoidal waveform according to aspects of the present disclosure. For example, the embodiment of FIG. 7 includes three windings spaced with 120 degrees of phase separation where the one or more scaled harmonics is a third harmonic scaled at $\frac{1}{6}^{th}$ the total amplitude of the sinusoidal waveform. Purely sinusoidal waveforms having the same fundamental amplitude as the one or more receive windings 704, 706, 708 are illustrated as dashed lines 714, 716, 718. As can be seen in FIG. 7, the one or more receive windings 704, 706, 708 can have a decreased width associated with the same fundamental amplitude as the purely sinusoidal waveforms 714, 716, 718. Thus, advantages according to the present disclosure can be achieved.

The position sensor assembly 700 can be arranged substantially around an axis of rotation 710 and configured to detect rotational motion of a rotor (not shown). For instance, the rotor can include a circumferentially variable coupling element that provides a varied electromagnetic response at the transmit winding 702 and/or at the one or more receive windings 704, 706, 708 at the as the rotor is rotated about the axis of rotation 710. The position sensor assembly 700 is a 3×120-degree sensor. For instance, the output of the position sensor assembly 700 repeats three times per revolution of the coupling element. In some embodiments, the position sensor assembly 700 can additionally and/or alternatively include arc shaped windings. For example, the windings 704, 706, 708 can extend about 120 degrees (e.g., as opposed to 360 degrees).

Figure 8:
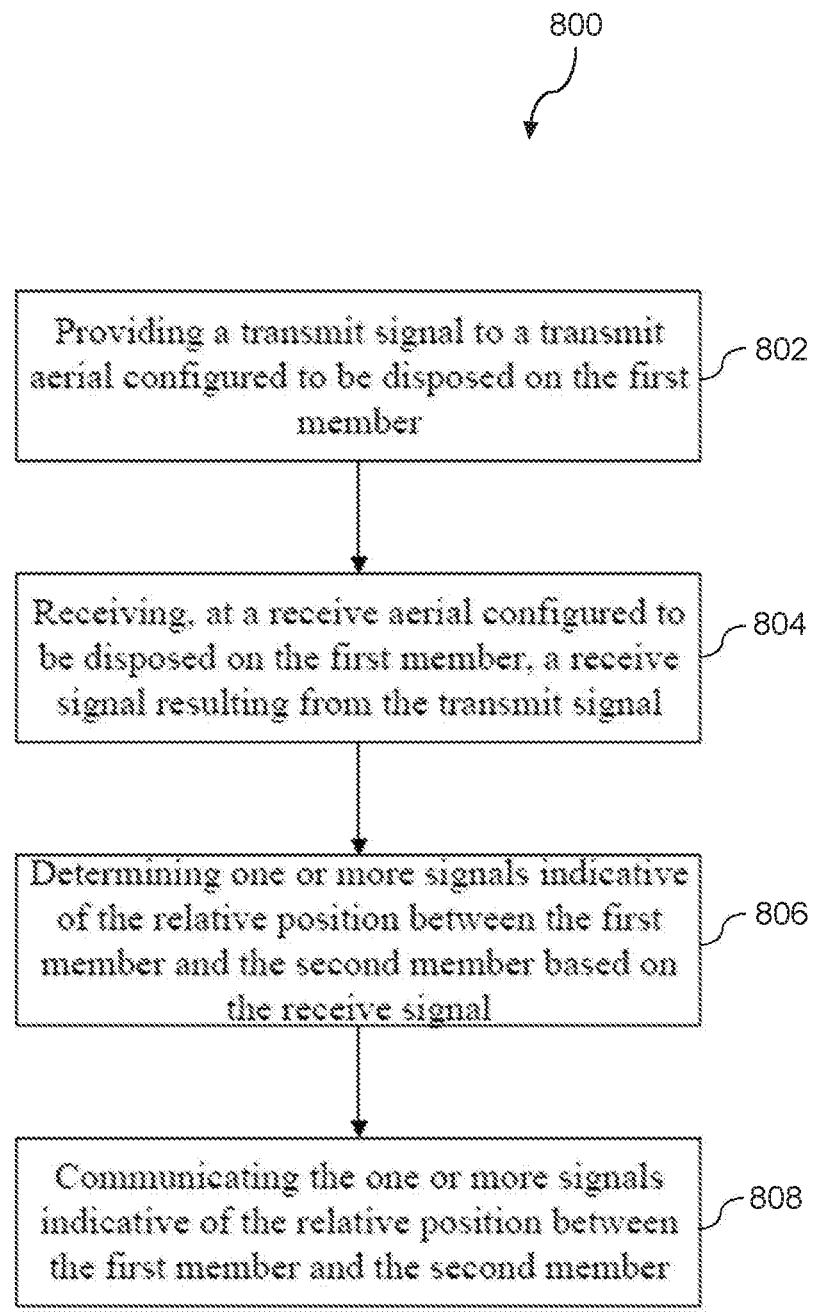
FIG. 8 depicts a method of position sensing according to example embodiments of the present disclosure.

FIG. 8 illustrates a flow diagram of an example method 800 of sensing a relative position between a first member and a second member according to aspects of the present disclosure. Although FIG. 8 depicts steps performed in a particular order for purposes of illustration and discussion, the methods discussed herein are not limited to any particular order or arrangement. One of ordinary skill in the art, using the disclosures provided herein, will appreciate that various steps of the methods disclosed herein can be omitted, rearranged, combined, include steps not illustrated and/ or adapted in various ways without deviating from the scope of the present disclosure. Moreover, the method 800 may be described herein with reference to the position sensors 100, 600, 700 described above with reference to FIGS. 1 through 7. However, it should be appreciated that the disclosed method 800 may be used for sensing a relative position between a first member and a second member using an inductive position sensor having any other suitable configuration.

At (802), an inductive position sensor can provide a transmit signal to a transmit aerial configured to be disposed on the first member. For example, the transmit signal can be an oscillating signal. For example, the transmit signal can be a signal provided to one or more transmit windings of the transmit aerial. The signal provided to the transmit aerial can induce a field, such as an electromagnetic field. In some embodiments, a shape of the one or more transmit windings is a combination of a sinusoidal waveform and one or more scaled harmonics of the sinusoidal waveform.

At (804), the inductive position sensor can receive, at a receive aerial configured to disposed on the first member, a receive signal resulting from the transmit signal. As used herein, a "receive signal" can refer to a signal induced in or resulting from processing a signal induced in the receive aerial. For instance, the field induced by the transmit aerial can interact with at least a portion of the second member, such as a coupling element disposed on the second member. For example, the field can induce a receive signal in one or more receive windings of the receive aerial. In some embodiments, a shape of the one or more receive windings is a combination of a sinusoidal waveform and one or more scaled harmonics of the sinusoidal waveform. In some embodiments, the at least a portion of the second member includes magnetic or conductive material.

The transmit aerial and/or the receive aerial can include one or more windings. For instance, the transmit aerial and/or the receive aerial can include an odd number of windings. For instance, the transmit aerial and/or the receive aerial can include three windings. In some embodiments, each winding in the three windings is separated by about 120 degrees of phase separation. In some embodiments, the one or more windings are connected in a Y or star configuration. In some embodiments, a length of the second member is between about 5% and about 25% of a wavelength of one or more of the one or more windings.

In some embodiments, the one or more scaled harmonics are selected based at least in part on a number of windings in the one or more windings such that the one or more scaled harmonics is eliminated at the receive signal. In some embodiments, the one or more scaled harmonics can be eliminated by processing the receive signal. For instance, in some embodiments, the one or more scaled harmonics is a third harmonic of the sinusoidal waveform. In some embodiments, an amplitude of the one or more scaled harmonics is about $\frac{1}{6}^{th}$ of an amplitude of the sinusoidal waveform.

At (806), the inductive position sensor can determine one or more signals indicative of the relative position between the first member and the second member based on the receive signal. For example, the relative position can be determined based on one or more differential measurements of the receive signal. For example, in some embodiments the one or more scaled harmonics of the sinusoidal waveform can be naturally eliminated at the differential measurements. In some embodiments, the shape of the one or more windings is such that the one or more signals indicative of the relative position between the first member and the second member varies linearly with the relative position. For instance, in some embodiments, the one or more signals can be determined by an atan or angle function that varies linearly with position.

At (808), the inductive position sensor can communicate the one or more signals indicative of the relative position between the first member and the second member. For instance, the one or more signals can be computed to a system, such as a computing system and/or a mechanical system operable to perform one or more actions based on the relative position between the first member and the second member.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. An inductive position sensor configured to detect a relative position between a first member and a second member, the inductive position sensor comprising:
   a transmit aerial configured to be disposed on the first member;
   a receive aerial configured to be disposed on the first member; and
   processing circuitry configured to provide one or more signals indicative of the relative position between the first member and the second member based on a receive signal induced in the receive aerial resulting from a signal provided to the transmit aerial;

wherein one or more of the transmit aerial and the receive aerial comprises one or more windings, and wherein a shape of the one or more windings is a combination of a sinusoidal waveform and one or more scaled harmonics of the sinusoidal waveform.

2. The position sensor of claim 1, wherein the one or more windings comprises an odd number of windings.

3. The position sensor of claim 1, wherein the one or more scaled harmonics are selected based at least in part on a number of windings in the one or more windings such that the one or more scaled harmonics is eliminated at the receive signal.

4. The position sensor of claim 1, wherein the one or more windings comprises three windings, each winding in the three windings being separated by about 120 degrees of phase separation.

5. The position sensor of claim 1 wherein the one or more scaled harmonics comprises a third harmonic of the sinusoidal waveform.

6. The position sensor of claim 1, wherein the one or more windings are connected in a Y or star configuration.

7. The position sensor of claim 1, wherein an amplitude of the one or more scaled harmonics is about $\frac{1}{6}^{th}$ of an amplitude of the sinusoidal waveform.

8. The position sensor of claim 1, wherein the shape of the one or more windings is such that the one or more signals indicative of the relative position between the first member and the second member varies linearly with the relative position.

9. The position sensor of claim 1, wherein the second member comprises magnetic or conductive material.

10. The position sensor of claim 9, wherein a length of the second member is between about 5% and about 25% of a wavelength of one or more of the one or more windings.

11. A method of determining a relative distance between a first member and a second, comprising:

providing a transmit signal to a transmit aerial configured to be disposed on the first member;

receiving, at a receive aerial configured to be disposed on the first member, a receive signal resulting from the transmit signal;

determining one or more signals indicative of the relative position between the first member and the second member based on the receive signal; and communicating the one or more signals indicative of the relative position between the first member and the second member;

wherein one or more of the transmit aerial and the receive aerial comprises one or more windings, and wherein a shape of the one or more windings is a combination of a sinusoidal waveform and one or more scaled harmonics of the sinusoidal waveform.

12. The method of claim 11, wherein the one or more windings comprises three windings, each winding in the three windings being separated by about 120 degrees of phase separation.

13. The method of claim 11, wherein the one or more windings are connected in a Y or star configuration.

14. The method of claim 11, wherein the one or more scaled harmonics comprises a third harmonic of the sinusoidal waveform.

15. The method of claim 11, wherein an amplitude of the one or more scaled harmonics is about $\frac{1}{6}^{th}$ of an amplitude of the sinusoidal waveform.

* * * * *